United States Patent Office 3,514,077
Patented May 26, 1970

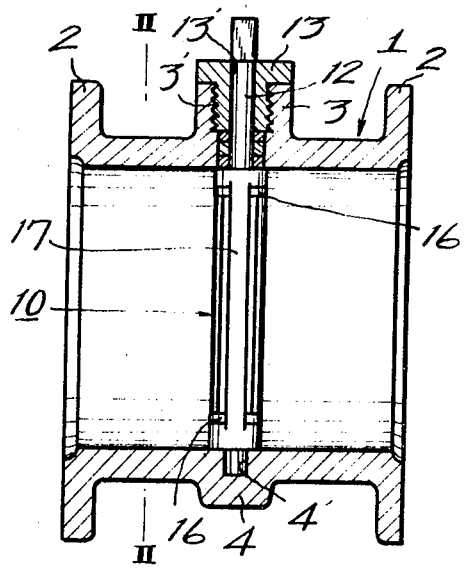
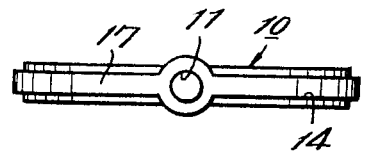
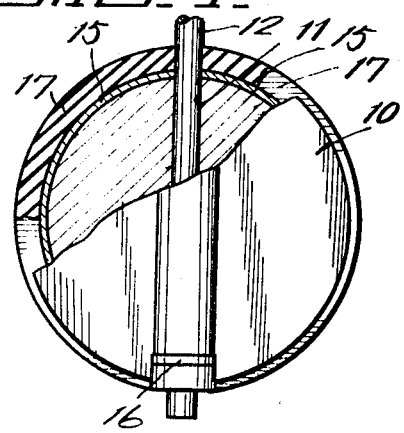
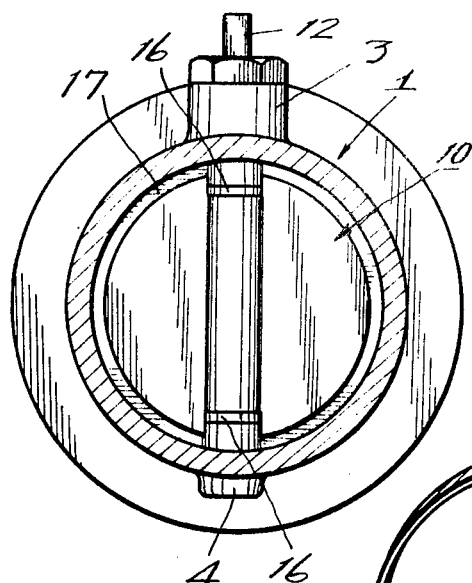
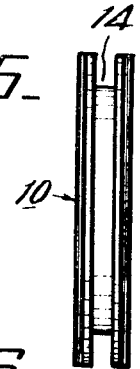
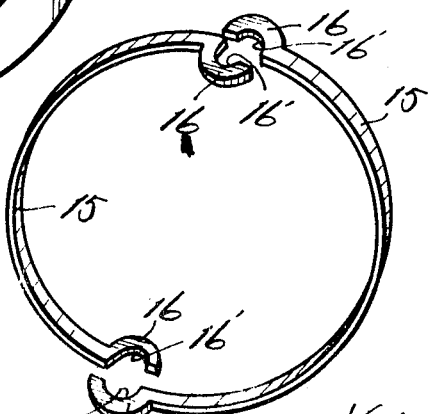
INVENTOR.
Kazuo Kitazawa
BY Beaman & Beaman
attys

3,514,077
BUTTERFLY VALVE
Kazuo Kitazawa, 21–13 2-chome, Ohara, Setagaya-ku, Tokyo, Japan
Filed Oct. 9, 1967, Ser. No. 673,545
Int. Cl. F16k 1/22
U.S. Cl. 251—306                                    3 Claims

ABSTRACT OF THE DISCLOSURE

A butterfly valve adapted to be used in conjunction with a piping system for transporting hydraulic fluid under high pressure and comprising a cylindrical casing or body adapted to be connected at the opposite ends to the flanges of adjacent pipes in said piping system; a peripherally grooved valve disc disposed within said casing for rotational movement therein; a pair of semi-circular leaf springs received in the peripheral groove of said valve disc in an end-to-end-engagement relation; an annular elastomeric packing disposed around said semi-circular springs within said peripheral groove of the valve disc with the outer peripheral edge projecting out of the groove; and a rotary shaft extending through a diameter of said valve disc.

Background of the invention

There have been hitherto proposed butterfly valves useful in piping systems for transporting hydraulic fluid under high pressure in which an annular rubber packing is disposed around the outer periphery of a valve disc which is rotationally disposed within a cylindrical casing extending across the interior of the casing so that a water-tight seal may be established between the outer periphery of the valve disc and the inner periphery of the casing as the butterfly valve is closed. A further improved butterfly valve has also been proposed in which a rotary valve disc which has an annular rubber packing disposed in the outer periphery thereof is adapted to contact the inner periphery of a cylindrical casing, in which the valve disc is normally disposed vertically extending at right angles to the longitudinal axis of the casing, at an angle smaller than the right angles to the casing axis as the butterfly valve is closed.

However, in any of the conventional butterfly valves referred to above, as the valve disc is rotated between the valve opening and closing positions by manipulation of an operation handle, the rubber packing is subjected to a substantial magnitude of stress or load in the direction in which the valve disc is rotated and as the result, the packing is caused to elastically yield and is deformed to a degree substantially corresponding to the magnitude of such a stress or load. Therefore, in such conventional butterfly valves, when the valve disc is rotated the rubber packing is subjected to both the above-mentioned stress in the rotational direction of the valve disc and the normal compressive force which the packing always sustains for providing a water-tight seal between the outer periphery of the valve disc and the inner periphery of the casing in all positions of the disc within the casing. Although the rubber packing can yieldingly absorb such stress and compressive force and regain its original configuration as the stress is removed therefrom by virtue of the inherent elasticity of the material of which the packing is formed, as the butterfly valve is repeatedly operated and accordingly, the valve disc is frequently rotated between the valve opening and closing positions thereby to cause the rubber packing thereon to be subjected to the stress which accompanies the rotational movement of the valve disc in addition to the normal compressive force, the packing rapidly wears away and as the result, the packing will fail to provide a positive and proper water-tight seal between the valve disc and casing and the packing must be frequently replaced.

Summary of the invention

Therefore, the present invention is to provide a novel and improved butterfly valve which can effectively eliminate the disadvantages inherent to the conventional butterfly valves as mentioned above.

A principal object of the present invention is to provide an improved butterfly valve which incorporates an improved water-tight seal arrangement therein whereby a proper and constant water-seal can be assured in the butterfly valve.

Another object of the present invention is to provide an improved water-tight seal arrangement for a butterfly valve which comprises an annular groove formed in the outer periphery of a valve disc, a pair of semi-circular leaf spring members disposed within said annular groove surrounding the entire circular bottom surface of the disc groove with the opposite and adjacent ends of the spring members disposed in an end-to-end-engagement relation to each other, and an annular elastomeric packing disposed around said pair of leaf spring members with a portion of the packing received within said annular groove while the other portion radially projects outwardly of the groove whereby a proper and constant water-tight seal may be at all times maintained between the outer periphery of the valve disc and the inner periphery of a cylindrical valve casing or body in which the valve disc is rotationally disposed vertically extending across the interior of the casing.

According to the present invention, there is provided a butterfly valve adapted to be installed in a piping system which transports hydraulic fluid under high pressure therethrough, comprising a cylindrical valve casing having flanges at the opposite ends for connection with the flanges of adjacent pipes in said piping system and a pair of opposite upper and lower outwardly extending bored bosses formed in the upper and lower points in the outer periphery thereof substantially midway between said flanges; a circular valve disc rotationally disposed within said casing vertically extending across the interior of the casing at right angles to the longitudinal axis of the latter and having an annular groove formed in the outer periphery and extending along the entire circumference thereof, a pair of upper and lower bores formed in the outer periphery and a center bore extending in the diameter of the disc which are aligned with said bores in the upper and lower bosses of the casing; a rotary shaft extending through said upper and lower bores in the bosses on the valve casing and said opposite upper and lower bores and center bore in the valve disc; a pair of semi-circular spring members disposed within said annular groove of the disc and having laterally extending semi-circular bosses at the opposite ends for embracing said shaft; and an annular elastomeric packing disposed around said pair of semi-circular spring members and having a pair of upper and lower aligned bores in alignment with said bores in the upper and lower bosses of the valve casing and said upper and lower bores and center bore of the valve disc.

Brief description of the drawing

The drawing schematically illustrates a preferred embodiment of butterfly valve constructed in accordance with the present invention and in which:

FIG. 1 is a side elevational view in vertical section of said preferred embodiment of butterfly valve;

FIG. 2 is a cross sectional view taken substantially along the line II—II of FIG. 1;

FIG. 3 is a fragmentary top plan view of a valve disc assembly of said butterfly valve;

FIG. 4 is a fragmentary elevational view of said valve disc assembly as shown in FIG. 3 with portion thereof broken away in order to show the details of the valve disc assembly;

FIG. 5 is a fragmentary side elevational view of said valve disc assembly as shown in FIGS. 3 and 4; and FIG. 6 is a fragmentary perspective view of a pair of leaf spring members of said valve disc assembly as shown in FIGS. 3, 4 and 5.

Preferred embodiment of the invention

The present invention will be now described referring to the various figures of the accompanying drawing in which one preferred form of butterfly valve embodying the present invention is illustrated. The novel butterfly valve generally comprises a cylindrical valve casing or body 1 which is provided at the opposite ends with integral flanges 2 and 2 which are adapted to be connected to the flanges (not shown) of opposite and adjacent pipes (not shown) laid in alignment with each other and to the butterfly valve in a piping system which is for transporting hydraulic fluid under high pressure therethrough. The cylindrical casing 1 is further provided at the top in the outer periphery in the center of the length thereof with an integral annular boss 3 through which the upper end portion of a rotary operation shaft of which description will be made hereinbelow loosely extends and at the bottom in the outer periphery with another integral boss 4 in the diametrically opposite position to the annular boss 3. The bottom boss 4 is provided with a center blind bore 4′, for receiving the lower end of the rotary shaft. A circular valve disc 10 having a vertically extending center bore 11 is rotationally disposed within the cylindrical casing 1 vertically extending across the interior of the casing at right angles to the longitudinal axis of the latter by means of a shaft 12 which extends through the center bore 11 with the upper end loosely extending through the threaded bore 3′ of the upper annular boss 3 and the lower end received in the center blind bore 4′ of the lower boss 4. The center bore 11 of the valve disc 10 is formed by a pair of raised portions which extend vertically in the diameter of the disc and project outwardly and arcuately from the opposite sides of the disc in the corresponding positions. The upper end portion of the shaft 12 is received within the threaded bore 3′ in the upper annular boss 3 with a hollow flanged plug 13 interposed therebetween and the plug is formed in its outer periphery with a thread for threaded engagement with the upper boss threaded bore 3′ with the flange thereof seating at the upper peripheral edge of the annular boss 3. In the illustrated embodiment, the upper boss 3 is shown as having a threaded bore 3′ and the plug 13 is also shown as having a threaded outer periphery for providing threaded engagement between them, but alternatively, the threaded bore 3′ may be replaced by a plain bore and the outer periphery of the plug 4 also may be formed plain. With such an alternative embodiment, the boss 3 and plug 13 are respectively formed with lateral aligned bores for receiving suitable fastening means such as pins which secure the boss and plug together. The plug 13 is also provided with a center opening 13′ which are in communication with the opening 3′ in the annular boss 3 and with the center bore 11 in the valve disc 10 and through which the upper end portion of the shaft 12 extends. The extreme upper end of the shaft 12 which extends above the top of the plug 13 is formed with a hexagonal configuration and receives thereon an operaing handle (not shown) so that the shaft 12 may be rotated by manipulation of the operating handle.

The above-mentioned circular valve disc 10 is formed throughout the entire outer periphery with an annular groove 14 and a pair of similar semicircular leaf spring members 15 and 15 are received in the annular groove 14. Each of the semi-circular spring members 15 is provided at the opposite ends with semi-circular lateral bosses or projections 16 and 16 which laterally project at right angles to the body of the respectively associated spring member, but extend in the opposite direction to each other. The semi-circular bosses 16 are formed with arcuate recesses 16′, respectively and the size of each arcuate recess 16′ is substantially the same as one-half of the outer diameter of the shaft 12. The pair of leaf spring members 15 are disposed in the entire annular groove 14 of the valve disc 10 in such a manner that the semi-cvircular boss 16 at one end of one spring member and the mating semi-circular boss 16 at the adjacent end of the other spring member cooperate with each other and snugly embrace the shaft 12 from the diametrically opposite sides of the periphery of the shaft. An annular elastomeric packing 17 having a pair of aligned openings in the diametrically opposite upper and lower positions in the periphery is disposed around the pair of leaf spring members 15 within the annular groove 14. The diameter of the pair of aligned openings of the annular packing 17 is so selected that the openings snugly and water-tightly receive the shaft 12 whereby water-tight seals may be established at the areas where the packing 17 contacts the shaft 12. Since the depth of the annular groove 14 is smaller than the combined thickness of both the spring members 15 and packing 17, the annular packing 17 may partially and radially project outwardly of the outer peripheral edge of the groove 14 and the annular packing 17 can provide a proper and positive water-tight seal between the outer periphery of the valve disc 10 and the inner periphery of the valve casing 1.

With the above construction and arrangement of the parts of the novel butterfly valve, when the butterfly valve is connected to the opposite and adjacent pipes in a piping system which transports hydraulic fluid under high pressure by means of the flanges of the valve casing and the adjacent pipes laid in alignment with each other and to the butterfly valve in the piping system and the valve disc 10 is subjected to the pressure of the hydraulic fluid, the pressure urges the leaf spring members 15 to radially and outwardly against the inner periphery of the annular packing 17 the outer periphery of which in turn is urged against the inner periphery of the casing 1 and at the same time to more firmly embrace the shaft 12 by means of the opposite and cooperating semi-circular bosses 16 whereby positive seals may be established between the outer periphery of the spring members 15 and the inner periphery of the annular packing 17, between the bosses 16 and the shaft 12 and between the outer periphery of the valve disc 10 and the inner periphery of the valve casing 1 and the possibility of any leakage of hydraulic fluid between the various adjacent parts of the butterfly valve can be positively prevented. Furthermore, since the two leaf spring members 15 are assembled in the novel and patricular manner as mentioned above, the spring members can rapidly and positively response to the pressure of hydraulic fluid which acts against the novel butterfly valve. In addition, even if the annular packing 17 wears away after the butterfly valve has been frequently operated, since the spring members 15 are adapted to be radially and outwardly urged against the annular packing 17 the spring members urge the packing outwardly and radially against the valve casing with a substantially constant force while compensating for the wear amount of the packing whereby the time interval elapsing between adjacent replacements of the packing may be substantially extended.

In operating, the operator grips a suitable operation handle, which is received on the hexagonal extreme upper end of the shaft 12 by means of a mating hexagonal opening formed at the fore end thereof, and turns the handle and accordingly, the shaft in a desired direction whereupon the valve disc 10 is also turned in the same direction because the shaft 12 is firmly embraced by the bosses 16 formed at the opposite ends of the two leaf springs 15.

From the foregoing, it will be understood that the present invention has provided an improved and novel butterfly valve to be installed in a piping system which is adapted to transport hydraulic fluid under high pressure and is markedly efficient and advantageous as compared with the similar conventional butterfly valves.

The present disclosure includes that contained in the appended claims, as well as that of the foregoing description.

What is claimed is:

1. A butterfly valve adapted to be installed in a pipe system which transports hydraulic fluid under high pressure comprising, in combination, a valve casing having connection means at the opposite ends thereof for connection with adjacent pipes in said pipe system and having an axial cylindrical bore defined therein, a cylindrical shaft rotationally mounted in said casing and diametrically extending through said bore, a circular valve disc disposed within said casing bore, said shaft diametrically extending through said disc wherein said disc is movably mounted between open and closed positions with respect to said bore, an annular groove defined in the periphery of said disc and extending throughout the entire circumference thereof, said shaft centrally intersecting said groove, a pair of semi-circular leaf spring members disposed within said annular groove each occupying substantially 180° of the circumference of said groove and tending to bow radially outward, and an annular elastomeric seal partially disposed within said groove having an inner annular surface engaged by said spring members whereby said spring members bias said seal radially outward for sealing engagement with said casing bore.

2. A butterfly valve as in claim 1 wherein each of said spring members includes first and second ends, and shaft embracing means defined upon said ends whereby said spring members are connected to said shaft while located within said groove.

3. A butterfly valve as in claim 2 wherein said shaft embracing means include a semi-circular boss defined on each spring member end which projects laterally of the general configuration plane of the body of the associated spring member and extends in the opposite direction to each other, each of said lateral bosses including a semi-circular recess having a size and configuration substantially corresponding to one half of the circumference of said shaft, said pair of spring members being arranged in said annular groove of said valve disc in such a manner that the boss at one end of one spring member and the boss at the adjacent end of the other spring member snugly embrace said shaft to provide a water-tight seal at points where said annular seal contacts said shaft.

References Cited
UNITED STATES PATENTS

| | | | |
|---|---|---|---|
| 2,385,510 | 9/1945 | Harwood | 251—306 |
| 2,657,896 | 11/1953 | Muller | 251—306 |
| 2,907,548 | 10/1959 | Maas et al. | 251—173 XR |
| 3,399,863 | 9/1968 | Fawkes | 251—306 |

HENRY T. KLINKSIEK, Primary Examiner